(12) United States Patent
Völkel

(10) Patent No.: US 6,654,024 B1
(45) Date of Patent: Nov. 25, 2003

(54) METHOD FOR DISPLAYING PRIMARY AND SECONDARY INFORMATION

(75) Inventor: Andreas Völkel, Braunfels (DE)

(73) Assignee: Mannesmann VDO AG, Frankfurt am Main (DE)

( * ) Notice: Subject to any disclaimer, the term of this patent is extended or adjusted under 35 U.S.C. 154(b) by 442 days.

(21) Appl. No.: 09/652,371

(22) Filed: Aug. 31, 2000

(30) Foreign Application Priority Data

Sep. 14, 1999 (DE) .......................................... 199 44 067

(51) Int. Cl.$^7$ ................................................. G09G 5/02
(52) U.S. Cl. ....................................................... 345/589
(58) Field of Search ................................ 280/248, 752; 296/71; 345/441, 589, 619, 629, 672, 681

(56) References Cited

U.S. PATENT DOCUMENTS 5,313,201 A * 5/1994 Ryan ........................... 340/961
5,673,987 A * 10/1997 Futschik et al. .............. 362/23

FOREIGN PATENT DOCUMENTS

| DE | 4412859 C1 | 11/1994 | ......... G08G/1/0962 |
| DE | 19531822 A1 | 4/1996 | ......... G08G/1/0962 |
| DE | 19531824 A1 | 4/1996 | ......... G08G/1/0962 |
| EP | 0 771 686 A2 | 5/1997 | ........... B60K/35/00 |
| JP | 0070174576 AA | 12/1993 | ......... G08G/1/0968 |

* cited by examiner

Primary Examiner—Matthew C. Bella
Assistant Examiner—G. F. Cunningham
(74) Attorney, Agent, or Firm—Richard A. Speer; Mayer, Brown, Rowe & Maw LLP

(57) ABSTRACT

In a method for displaying primary and secondary information in a motor vehicle by reproducing symbols on a display, the symbols are shown with different brightnesses according to their importance. Their brightness is changed as the importance of the information changes.

2 Claims, 1 Drawing Sheet

METHOD FOR DISPLAYING PRIMARY AND SECONDARY INFORMATION

BACKGROUND OF THE INVENTION

The invention relates to a method for displaying primary and secondary information in a motor vehicle by reproducing symbols on a display.

In the context of predicative instructions, the importance of the instruction first increases usually over the course of time or, in the context of vehicle navigation, over the distance covered. If, for example in the vehicle navigation context, an instruction is to be given that it is necessary to leave the autobahn at the next but one exit, then this instruction has low importance for the driver at first, so that it is not absolutely necessary for him to be aware of it. No later than when it is necessary to indicate and get into the right-hand lane in order to turn off does the originally secondary instruction turn into primary information which must not be overlooked.

In previously customary vehicle navigation devices, no distinction is drawn between primary and secondary information. However, in the case of warnings and monitoring displays in the motor vehicle, it is usual to arrange displays for secondary information further from the driver's direct range of view than the displays for primary information. In addition, it is usual to accentuate primary information by conspicuous coloration or a higher level of brightness than the secondary information.

BRIEF SUMMARY OF THE INVENTION

The invention is based on the problem of devising a method of the type mentioned in the introduction such that the driver can clearly see the priority of an item of information from the type of representation.

The invention solves this problem by virtue of the symbols being shown with different brightnesses according to their importance, and their brightness being changed as the importance of the information changes.

With such a display method, the conspicuousness of a display indicates the current importance of this display. In addition, the change in the brightness of the display indicates whether the information is becoming more important or is becoming less important. Since, on the basis of the method according to the invention, secondary information is displayed with a relatively low level of conspicuousness for as long as it is actually secondary information, a driver is distracted less by such information than in the case of the previous display methods. The method according to the invention is quite particularly suitable for vehicle navigation systems, because it allows turnoff instructions to be shown with a relatively low level of conspicuousness for as long as they remain non-urgent.

One particularly advantageous development of the method is that the secondary information is first shown with low brightness, is shown with a brightness increasing up to the brightness of the primary information once a high level of importance has arisen, and is then shown with constant brightness when the secondary information develops into primary information, and that the original primary information which has then turned into secondary information is faded out by means of reducing brightness.

In addition to changing the brightness of a display, its importance can also be accentuated in that, on the basis of one advantageous development of the method according to the invention, as the importance of secondary information increases, this secondary information is visualized closer to the primary information.

The method according to the invention supports various modifications. To clarify its basic principle further, an illustrative embodiment is shown in the drawing and is described below.

DETAILED DESCRIPTION OF THE INVENTION

Figure 1:
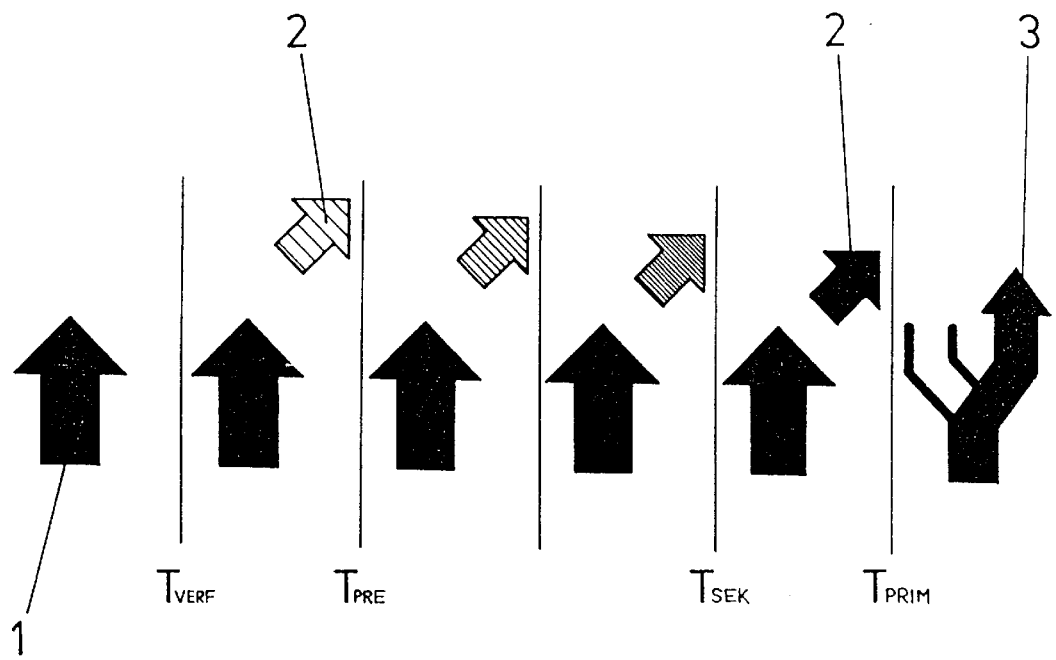
FIG. 1 shows a display sequence in a vehicle navigation system.

The first item which can be seen on the sequence of displays shown in FIG. 1 is a clearly visible arrow 1 pointing straight on as primary information. At an instant $T_{verp}$ a faintly visible arrow 2 pointing diagonally to the right appears on the display, informing the driver that he soon needs to turn right. This instruction begins to become relevant after $T_{Pre}$ and therefore becomes brighter. At the instant $T_{sek}$, the diagonal arrow 2 has reached its full level of relevance and therefore its full brightness at the same time, i.e. the driver needs to turn right at the next opportunity. In the display shown on the far right in FIG. 1, the diagonal arrow 2 and the straight arrow 1 have disappeared. Instead, the primary information which appears is a new display in the form of an arrow 3 having two bends.

Figure 2:
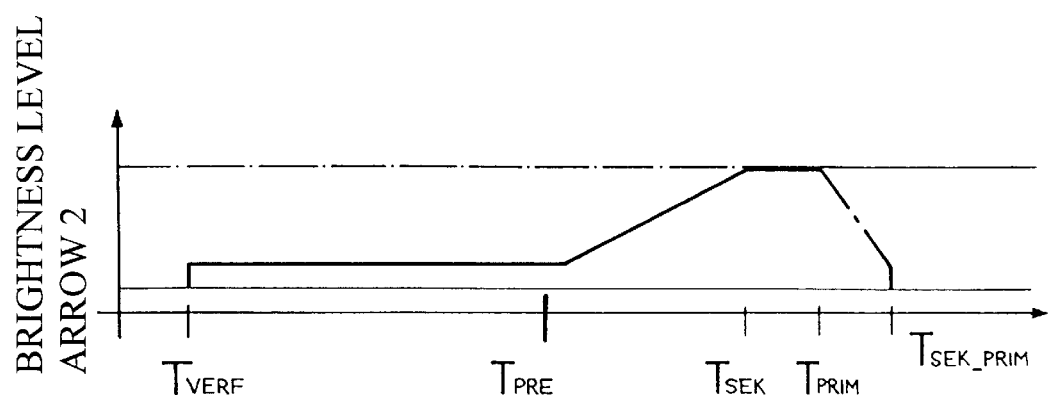
FIG. 2 shows the brightness curve for the display sequence shown in FIG. 1.

FIG. 2 clearly shows that the arrow 2 first appears with a low level of brightness but becomes brighter at instant $T_{Pre}$ until instant $T_{Sek}$ is reached. From instant $T_{Sek}$, this brightness is maintained until instant $T_{Prim}$. Between $T_{Prim}$ and $T_{Sek\_Prim}$ the brightness is reduced until the display disappears completely.

What is claimed is:

1. A method for displaying directional information in a vehicle navigation system comprising:
    (a) displaying a primary information symbol that identifies the current direction of travel of the vehicle;
    (b) illuminating the primary symbol to a preselected and constant level of brightness;
    (c) displaying a secondary information symbol that identifies a prospective change to be made in the current direction of travel by the vehicle when it reaches a preselected location;
    (d) initially illuminating the secondary symbol to a preselected level of brightness that is less than the level of brightness of the primary symbol;
    (e) progressively increasing the level of brightness of the secondary symbol from the initial level to a final level equivalent to that of the primary symbol as the vehicle approaches the location at which the prospective change in direction is to be effected; and
    (f) extinguishing both primary and secondary information symbols when the change in direction is effected and thereafter displaying a new primary information symbol.

2. The method as claimed in claim 1, wherein, as the brightness of the secondary symbol increases, the secondary symbol is displayed physically closer to the primary information symbol.

* * * * *